United States Patent [19]

Yamaguchi et al.

[11] Patent Number: 4,572,466
[45] Date of Patent: Feb. 25, 1986

[54] HARNESS CLIP

[75] Inventors: Noboru Yamaguchi, Zama; Kiichiro Ito, Chigasaki, both of Japan

[73] Assignees: Nissan Motor Co., Ltd.; Kato Hatsujo Kaisha Limited, both of Japan

[21] Appl. No.: 603,750

[22] Filed: Apr. 25, 1984

[30] Foreign Application Priority Data

May 27, 1983 [JP] Japan ................................. 58-93441

[51] Int. Cl.$^4$ .............................................. F16L 3/12
[52] U.S. Cl. ..................................... 248/73; 248/74.3; 24/16 PB
[58] Field of Search ..................... 248/60, 62, 74.3, 73, 248/221.3, 221.4, 231, 231.9, 505, 544; 24/16 PB, 17 AP, 17 A, 17 R, 30.5 P

[56] References Cited

U.S. PATENT DOCUMENTS 3,550,219 12/1970 Van Buren ............................ 248/73
3,819,139 6/1974 Jemison ................................ 248/73
4,135,749 1/1979 Caveney ........................... 24/16 PB
4,371,137 2/1983 Anscher ................................ 248/73
4,447,934 5/1984 Anscher ............................. 248/74.3
4,490,886 1/1985 Omata ............................... 24/16 PB

FOREIGN PATENT DOCUMENTS 2647804 4/1978 Fed. Rep. of Germany .
2842408 6/1979 Fed. Rep. of Germany .
2946258 6/1980 Fed. Rep. of Germany .
2380456 9/1978 France .
2090907 7/1982 United Kingdom .

Primary Examiner—J. Franklin Foss
Assistant Examiner—Robert A. Olson
Attorney, Agent, or Firm—Leydig, Voit & Mayer, Ltd.

[57] ABSTRACT

An anchor leg is formed with an elongated projection extending longitudinally thereof and a resilient harness clip is formed with an elongated groove for engagement with the projection to hold a free end of the strap in contact with the anchor leg for thereby preventing the former from diverging from latter toward its distal end.

10 Claims, 7 Drawing Figures

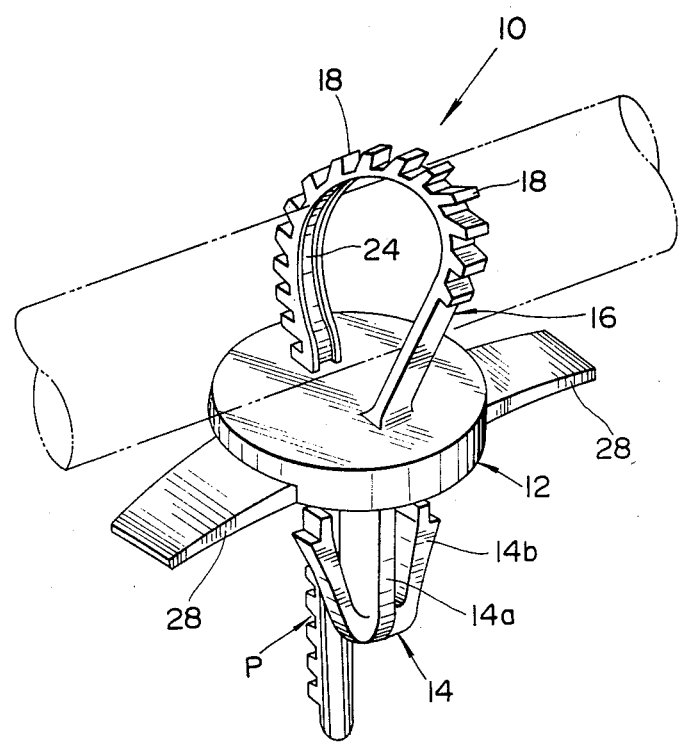

HARNESS CLIP

BACKGROUND OF THE INVENTION

1. Field of the Invention

The present invention relates in general to fasteners and more particularly to one-piece plastic harness clips for securing a wire harness or the like elongated object to a support such as an apertured panel of a vehicle body.

2. Description of the Prior Art

As disclosed in the Japanese Provisional Patent Publication No. 57-93028, such a one-piece harness clip is known in the art that consists of a base having a stepped aperture, an anchor leg having a slanting shoulder and a resilient strap having a series of teeth on one side thereof and adapted for insertion into the stepped aperture to form a loop by which a wire harness is encircled. The teeth of the strap are adapted for temporary engagement with the base when the strap is placed around a wire harness and for permanent engagement with an apertured panel in cooperation with the slanting shoulder of the anchor leg. A plurality of harness clips are used for securing a wire harness to a support.

A disadvantage of this kind of harness clip is that installation of a number of such harness clips involves a laborious and time-consuming work since insertion of each harness clip into the apertured panel requires a relatively large pushing force which is to be applied on the teeth of the strap and a worker is likely to suffer from a pain in his hands during the installation work. This is due to the fact that the free end portion of the looped strap tends to diverge from the leg toward its distal end, allowing the teeth to abut strongly against the apertured panel to obstruct the insertion of the strap and to the fact that the teeth of the strap require to have a large thickness and a sharp edge at the top for assured and reliable engagement with the apertured panel.

SUMMARY OF THE INVENTION

In a one-piece plastic harness clip of the kind having plate-like base with an aperture, an anchor leg and a resilient strap having a series of teeth for engagement with the base when inserted into the aperture, the anchor leg is formed with an elongated projection extending longitudinally thereof, and the strap is formed with an elongated groove extending longitudinally thereof and engageable with the projection. Due to the interenagement of the projection and the groove, the free end portion of the strap is held in contact with the anchor leg and therefore is prevented from diverging from the anchor leg toward its distal end. This is quite effective for reducing the force necessary for inserting the harness clip into an apertured support to which it is to be installed.

In one embodiment, the base is provided with a pair of wing-like leaf springs with which the anchor leg cooperates to fasten the base to the support. This enables the teeth of the strap to be constructed only for engagement with the base, i.e., for permanent engagement with the base, whereby the teeth of the strap can be smaller in strength and the sharp edge on the top of the teeth otherwise necessitated can be made unneccessay. Further, insertion of the harness clip into the apertured support does not require a pushing force to be applied on the teeth of the strap.

It is accordingly an object of the present invention to provide a novel and improved one-piece plastic harness clip which is free from the disadvantages noted above.

BRIEF DESCRIPTION OF THE DRAWINGS

The features and advantages of the harness clip according to the present invention will become more clearly appreciated from the following description taken in conjunction with the accompanying drawings, in which:

FIG. 7 is a perspective view of the harness clip of FIG. 3 and showing the same in its condition of being used for fastening thereto a wire harness.

DESCRIPTION OF THE PREFERRED EMBODIMENT

Figure 1:
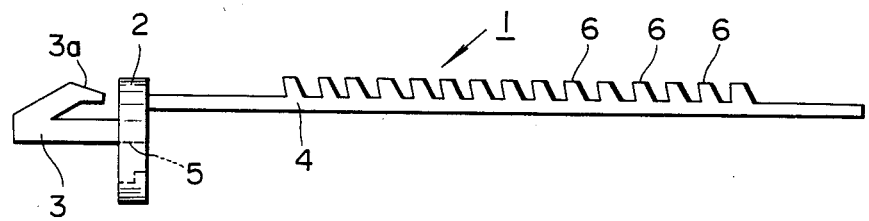
FIG. 1 is an elevational view of a prior art harness clip.
Figure 2:
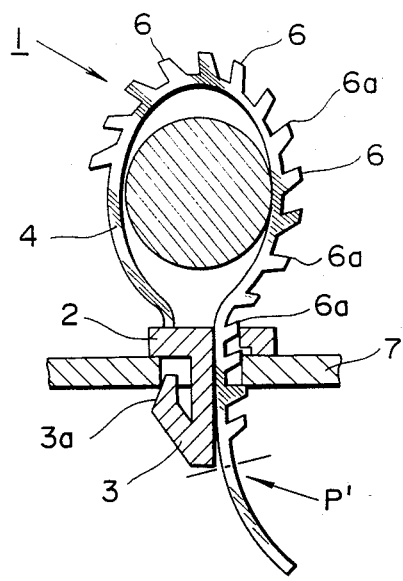
FIG. 2 is a partly sectioned elevational view of the prior art harness clip of FIG. 1 and showing the same in its condition of being used for securing a harness clip to an apertured panel.
Figure 3:
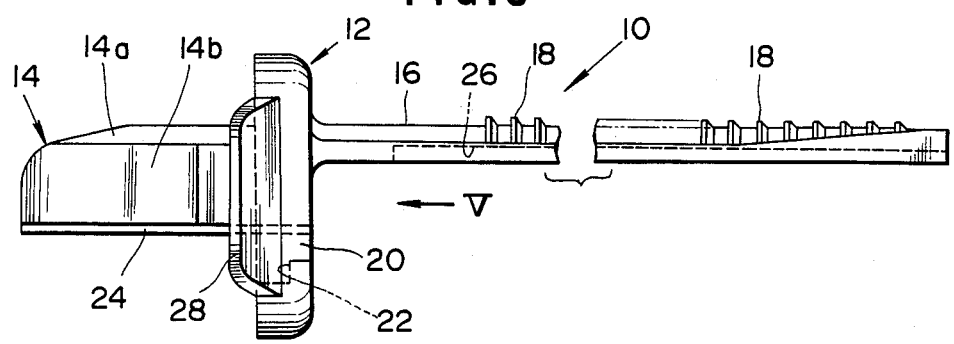
FIG. 3 is a partly cutaway elevational view of a harness clip according to the present invention.

Referring to FIGS. 1 and 2, description is first made to the prior art harness clip disclosed in the aforementioned Japanese Provisional Patent Publication No. 57-93028 for a better understanding of the inventive step of the present invention.

The harness clip is generally designated by 1 and consists of a circular base 2, a hook-shaped anchor leg 3 positioned on one side of the base 2 and having at its distal end a slanting shoulder 3a, and a resilient strap 4 having a series of teeth 6 on one side thereof and positioned on the other side of the base 2. The base 2 is formed with a stepped aperture 5 into which the strap 4 is inserted to form a loop by which a wire harness is encircled as shown in FIG. 2. The harness clip 1 is a single piece and molded from a resilient synthetic resinous material.

The teeth 6 of the strap 4 are adapted for temporary engagement with the stepped aperture 5 when the strap 4 is placed around a wire harness and inserted at its free end portion into the stepped aperture 5. The teeth 6 are also adapted for permanent engagement with an apertured panel 7 in cooperation with the slanting shouler 3a of the anchor leg 3.

In use, the strap 4 is first placed around a wire harness and inserted into the stepped aperture 5 of the base 2 for fastening the wire harness to the harness clip 1. The excess part of the free end portion of the strap 4 may be cut at P'. The harness clip 1 is then installed to the apertured panel 7 together with the wire harness by pushing the anchor leg 3 and the free end portion of the strap 4 into the aperture (no numeral) of the panel 7 and allowing them to pass therethrough. Some one of the teeth 6 allowed to pass through the apertured panel 7 is brought into engagement with the panel 7 in cooperation with the slanting shoulder 3a and prevents the harness clip 1 from being dropping off therefrom. The teeth 6 are therefore adapted to serve as another anchor leg which cooperates with the anchor leg 3 to effect the above engagement.

In order to serve as an anchor leg, the teeth 6 are required to have a large thickness for securing a predetermined strength and also to have a sharp edge 6a at the top of an assured and reliable engagement with the apertured panel 7. Further, the free end portion of the looped strap 4 tends to flex in the direction opposite to the anchor leg 3, i.e., tends to diverge from the anchor leg 3 toward its distal end. For the above reasons, a large pushing force to be applied on the teeth is necessary for insertion of the harness clip 1 into the apertured panel 7, and resultantly a worker will suffer from a pain in his hands during the installation work. Installation of a number of such harness clips therefore involves a laborious and time-consuming work.

The above disadvantages and shortcomings encountered in the prior art are overcome by the harness clip according to the present invention which will be described hereinafter with reference to FIGS. 3 to 7.

Figure 5:
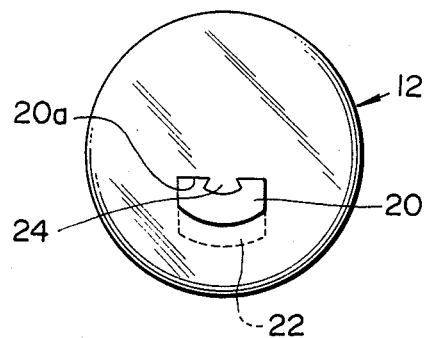
FIG. 5 is a view taken along the arrow V of FIG. 3 with some portion being omitted.
Figure 6:
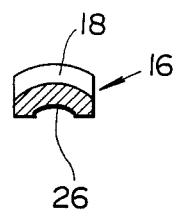
FIG. 6 is a sectional view taken along the line VI—VI of FIG. 4.

The harness clip according to the present invention is generally designated by 10 and comprises a base 12 in the form of a circular plate of uniform thickness, an anchor leg 14 in the form of an arrowhead and positioned on one side of the base 12 and a resilient strap 16 having a series of teeth 18 on one side thereof and positioned on the other side of the base 12. The base 12 is formed with a stepped aperture 20 into which the strap 16 is inserted to form a loop by which a wire harness or the like elongated object is encircled. As best shown in FIG. 5, the stepped aperture 20 is formed at a position offset from the center of the base 12 and has a shoulder 22.

Differing from the previously described prior art example, the teeth 18 of the strap 16 are adapted for permanent engagement with the stepped aperture 20 when the strap 16 is placed around a wire harness and inserted at its free end portion into the stepped aperture 20 to fasten the wire harness to the base 12, which will be understood as the description proceeds further.

The anchor leg 14 in the form of an arrowhead has a shaft section 14a extending substantially normal to the base 12 and secured at an end thereof to the substantially central portion of same. The anchor leg 14 also has a pair of arm sections 14b joined in a manner to form a wedge-shape or V-shape and connected at the joint thereof to an end of the shaft section 14a remoter from the base 12 in such a manner as to flare toward the base 12 and to have distal ends 14c spaced a predetermined distance away from the inner side surface 12a of the base 12. The distance between the distal ends 14c and the inner side surface 12a of the base 12 is determined depending upon the thickness of a support to which it is to be installed.

The shaft section 14a of the anchor leg 14 is formed with a projection 24 elongated longitudinally thereof and extending throughout the length thereof. The projection 24 has a fan-shaped cross section (a cross section resembling a tail of a bird), i.e., such a cross section that increases in width as it projects outward of the shaft section 14a, and is formed on the side of the shaft section 14a with which the strap 16 is matched when inserted into the stepped aperture 20. The teeth 18 is formed on the side of the strap 16 opposite to the side at which the strap 16 is matched with the shaft section 14a of the anchor leg 14.

Figure 4:
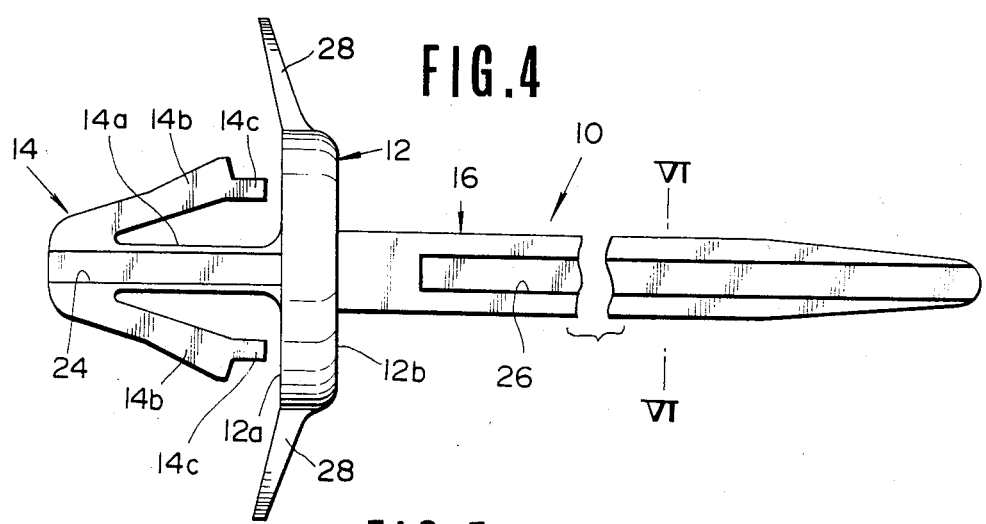
FIG. 4 is a partly cutaway side elevational view of the harness clip of FIG. 3.

The strap 16 which extends away from the outer side surface 12b of the base 12 in the direction opposite to the anchor leg 14, is formed with a groove 26 for engagement with the projection 24 throughout the length thereof except the base portion adjacent the base 12 as best shown in FIG. 4. The groove 26 is thus formed in the side of the strap 16 which is matched with the shaft section 14a of the anchor leg 14 and has a cross section corresponding to that of the projection 24 so that when the free end portion of the strap 16 is inserted into the stepped aperture 20 and allowed to pass therethrough, it is held in contact with the shaft section 14a of the anchor leg 14 due to the interengagement of the projection 24 and the groove 26.

The stepped aperture 20 is adapted to be defined by a wall 20a of the base 12 that lies flush with the side of the shaft section 14a on which the projection 24 is formed. The base 12 is formed with an extension of the projection 24 on the wall 12a for facilitating interengagement of the projection 24 and the groove 26 upon insertion of the strap 16 into the stepped aperture 20.

The harness clip 10 further comprises a pair of wing-like leaf springs 28 connected to the diametrically opposed circumferential portions of the base 12 and so arranged as to decline slightly toward the anchor leg 14 as they go away from the base 12.

The harness clip 10 is molded from a resilient synthetic resinous material and formed into a single piece.

In use, the strap 16 is first placed around a wire harness and inserted at its free end portion into the stepped aperture 20 to fasten the wire harness to the harness clip 10 with a desired tightness. Some one of the teeth 18 is brought into engagement with the shoulder 22 to prevent the free end portion of the strap 16 from being pulled off from the base 12. In this instance, due to the interengagement of projection 24 and the groove 26, the free end portion of the strap 16 allowed to pass through the base 12 to position on the anchor leg side thereof is held in contact with the shaft section 14a so long as it extends therealong. The excess part of the free end portion of the strap 16 is cut as indicated by P in FIG. 7 so that the free end portion of the strap 16 projecting from the base 12 to position on the anchor leg side thereof has nearly the same length as the shaft section 14a of the anchor leg 14.

The anchor leg 14 together with the free end portion of the strap 16 is then inserted into a corresponding aperture of an apertured panel (not shown). When this is the case, the arm sections 14b of the anchor leg 14 are first resiliently deformed to come closer to each other to pass the aperture and then spread when allowed to pass therethrough, allowing the apertured panel to intervene between the distal ends 14c and the base 12. Since the distal ends 14c of the arm sections 14b are urged by the leaf springs 28 against the inner surface of the apertured panel to clamp firmly therebetween the apertured panel, the base 12 remains assuredly and reliably fastened or installed to the apertured panel.

In the foregoing, it is to be understood that the teeth 18 of the strap 16 are not adapted to serve as an anchor leg but only to engage permanently with the shoulder 22 of stepped aperture 20 for preventing the strap 16 from becoming loose or being pulled off from the base 12. For this reason, the teeth 18 do not require to be so thick and so sharp at an edge of the top as in the case of the previously described prior art example.

It is further to be understood that the free end portion of the strap 16 does not diverge from the shaft section 14a of the anchor leg 14 but held in contact therewith due to the interengagement of the projection 24 and the groove 26, whereby the anchor leg 14 can be easily inserted into the apertured panel and therefore installation of the harness clip 10 does not involve a laborious and time-consuming work.

Furthermore, since insertion of the harness clip 10 into an apertured panel does not require a pushing force to be applied on the teeth 18 of the strap 16 and further since the teeth 18 do not require to be so thick and so sharp at an edge of the top as before, it does not happen that a worker suffers from a pain in his hands during the installation work.

What is claimed is:

1. A one-piece plastic harness clip comprising:
   a plate-like base having an aperture passing therethrough;
   an anchor leg projecting from one side of said base;
   a resilient strap projecting from the other side of said base and having a series of teeth for engagement with said base when inserted at its free end portion into said aperture;
   an elongated projection formed on and extending longitudinally of said anchor leg; and
   an elongated groove extending longitudinally of said strap and interengageable with said projection to hold said free end portion of said strap in contact with said anchor leg.

2. A one-piece plastic harness clip as set forth in claim 1, in which said projection has a fan-shaped cross section, and in which said groove has a cross section corresponding to that of said projection.

3. A one-piece plastic harness clip as set forth in claim 2, in which said anchor leg is in the form of an arrowhead and comprises a shaft section extending substantially normal to said base and secured at an end to said base, and also comprises a pair of arm sections joined in a manner to form a wedge-shape and connected at the joint thereof to an end of said shaft remote from said base in such a manner as to flare toward said base and to have distal ends spaced a predetermined distance away from the associated side of said base, and in which said shaft section is formed with said projection which is elongated longitudinally thereof and extends throughout the length thereof.

4. A one-piece plastic harness clip as set forth in claim 3, in which said base is circular and of substantially uniform thickness.

5. A one-piece plastic harness clip as set forth in claim 4, further comprising a pair of wing-like leaf springs connected to diametrically opposed circumferential portions of said base and so arranged as to decline slightly toward said anchor leg as they go away from said base.

6. A one-piece plastic harness clip as set forth in claim 5, in which said strap is formed with said teeth on one side thereof and said groove on the opposite side thereof, and in which said strap is formed with said groove substantially throughout the length thereof except for a portion adjacent said base.

7. A one-piece plastic harness clip as set forth in claim 6, in which said aperture of said base is a stepped aperture having a shoulder with which some one of said teeth of said strap engages when said free end portion of said strap is inserted into said aperture.

8. A one-piece plastic harness clip as set forth in claim 7, in which said aperture is formed in said base at a position offset from the center of same.

9. A one-piece plastic harness clip as set forth in claim 8, in which said shaft section of said anchor leg is connected at said end to a central portion of said base, said shaft section having a side surface on which said projection is formed, said stepped aperture being formed by a wall of said base which lies substantially flush with said side surface of said shaft section, and in which said base is formed with an extension of said projection on said wall.

10. A one-piece plastic harness clip comprising:
    a plate-like base having an aperture passing therethrough;
    an anchor leg projecting from one side of said base;
    a resilient strap projecting from the other side of said base and having a series of teeth for engagement with said base when inserted at its free end portion into said aperture;
    in which one of said anchor leg and said strap is formed with an elongated projection extending longitudinally thereof; and
    in which the other of said anchor leg and said strap is formed with an elongated groove extending longitudinally thereof and interengageable with said projection to hold said free end portion of said strap in contact with said anchor leg.

* * * * *